T. R. Williams.
Felting Machine.
Reissued May 6, 1851
No 198
5992X
RELATED DOC
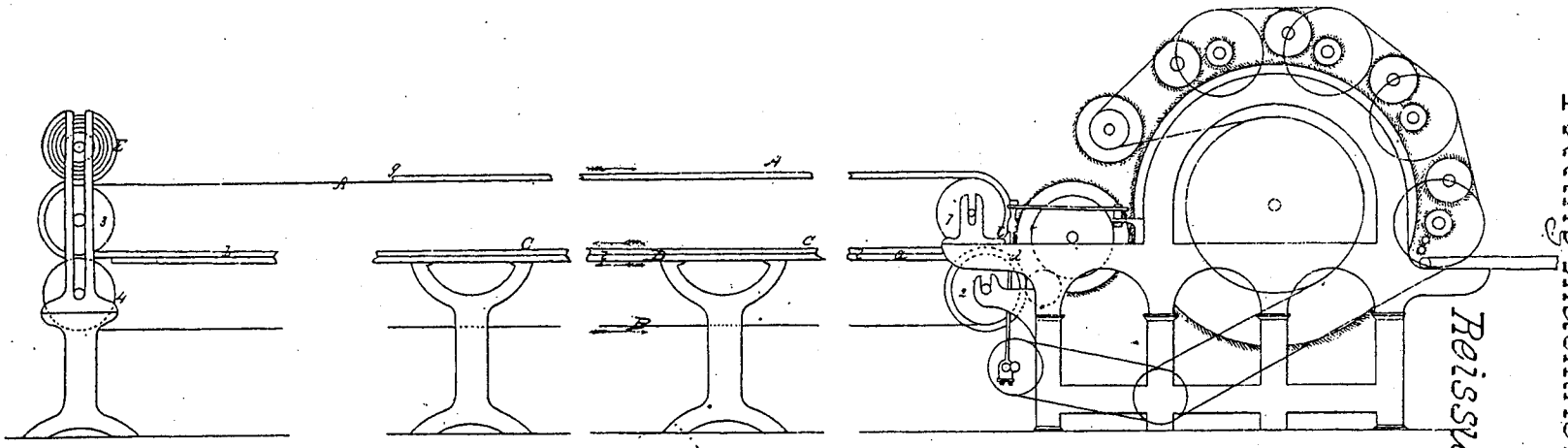

UNITED STATES PATENT OFFICE.

J. BURROWS HYDE, OF NEW YORK, N. Y., ASSIGNEE OF T. R. WILLIAMS.

IMPROVEMENT IN MACHINERY FOR FORMING BATS FOR FELTING, &c.

5992X
Related Doc

Specification forming part of Letters Patent dated December 14, 1840; Reissue No. 198, dated May 6, 1851.

*To all whom it may concern:*

Be it known that THOMAS ROBINSON WILLIAMS, a citizen of the United States, now deceased, did invent a certain Improvement in Machinery for Forming Bats in the Manufacture of Felt, being a part of the improvements described in the specification of Letters Patent granted for improvements in the machinery and process for the manufacture of felt to the said THOMAS ROBINSON WILLIAMS, bearing date the 14th day of December, 1840; and I do hereby declare that the following is a full, clear, and exact description thereof, reference being had to the accompanying drawing, making part of this specification, in which—

Figure 1 is a side elevation of the machine.

The object of this invention is to produce long, even, and uniform bats of wool or other material or materials of any required length, breadth, and thickness, which may be then formed into cloth by hardening and felting; and the nature of this invention consists in the employment, in combination, of two or more endless belts, the two being so arranged with respect to each other as to receive the thin sliver of wool between them, one or more layers being wound on one, while the other forms a support for the bat as it is being formed or wound up.

By reference to the drawing it will be seen that the wool-carding machine, which is of the ordinary construction, is combined with two long revolving aprons, A B and C D, of cloth, (or of any other suitable material,) the said aprons passing over rollers or drums 1 2 3 4, and receiving a motion from the doffers of the card, as there represented, or from any convenient part of the carding-machine. These aprons and drums revolve in opposite directions, as represented by the arrows, so that the two inner surfaces, *a b*, move in the same direction with uniform speed and with nearly the same velocity with the doffers of the card as regard their surfaces. The wool is taken off from the doffers by the usual comb-crank motion in an attenuated sliver. This sliver is now received between the two revolving aprons at *c d*, which have a slight flooring, *i i*, for their support, and passes on between them until it arrives at the end of the aprons. A direction is then given to it so that it shall pass up and over the upper apron, A C, and wind itself upon this apron, one sliver over another, until the bat has become of sufficient thickness, it being during this operation supported and sustained in contact with the apron A C by the apron B D, for which this is principally intended.

As the apron A C may be of any determinate length and width corresponding with the card, it is evident that any fixed quantity of wool being passed through the engine and received upon this apron may be made to produce any required thickness of bat, and consequently any required weight of goods per yard that may be desirable after having undergone the succeeding operations I may here also observe that, when there is not sufficient room in a building or from any other cause for carrying out these aprons of sufficient length in one direction, I sometimes wind them backward and forward with the sliver over rollers or drums. The bat having acquired its requisite thickness, it is then cut across its width, as represented at *g*, and the bat being passed over the roller E, it is wound firmly upon it by the contact of the roll with the apron A C. When the other end of the bat reaches the roll 1 it brings with it the sliver which is, as before, passed up over the apron A C, and another bat is then commenced.

What is claimed as the invention of the said THOMAS ROBINSON WILLIAMS is—

The method, substantially as described, of forming the bat by the combined use of two endless aprons, which receive the sliver from the doffer, or a carding-engine or otherwise, between them, and form the bat on one of the belts, while the other acts as a support, substantially as described.

J. BURROWS HYDE.

Witnesses:
ALEX. J. PORTER BROWN,
CONSTANT BROWN.